United States Patent
Crowder

[11] 4,043,054
[45] Aug. 23, 1977

[54] TEACHING MACHINE

[75] Inventor: Norman A. Crowder, Fort Worth, Tex.

[73] Assignee: Sargent-Welch Scientific Company, Skokie, Ill.

[21] Appl. No.: 442,087

[22] Filed: Feb. 13, 1974

[51] Int. Cl.² .............................................. G09B 7/08
[52] U.S. Cl. ..................................... 35/9 A; 242/204
[58] Field of Search ................ 35/8 R, 9 R, 9 A, 9 B, 35/9 D, 35 C, 48 R, 10; 40/31; 352/72, 78, 235

[56] References Cited

U.S. PATENT DOCUMENTS

| | | | |
|---|---|---|---|
| 1,655,297 | 1/1928 | Thornton | 352/235 X |
| 3,141,243 | 7/1964 | Chapman et al. | 35/9 A X |
| 3,344,534 | 10/1967 | Anschutz et al. | 35/9 A |
| 3,355,818 | 12/1967 | Whitehorn | 35/9 A |
| 3,431,047 | 3/1969 | Lancor | 352/72 |
| 3,538,622 | 10/1970 | Zadig | 35/9 A |
| 3,558,142 | 1/1971 | Poessel | 35/35 C X |
| 3,584,396 | 6/1971 | Hannah et al. | 35/9 A |
| 3,685,171 | 8/1972 | Kosaka | 35/35 C |
| 3,798,793 | 3/1974 | Kachi | 35/9 A |

*Primary Examiner*—Anton O. Oechsle
*Assistant Examiner*—Vance Y. Hum
*Attorney, Agent, or Firm*—Lockwood, Dewey, Zickert & Alex

[57] ABSTRACT

A teaching machine system for displaying selected frames from a multiple-frame film strip wherein instructional material is contained on a first portion of each frame and code indicia including an excursion instruction is contained on a second portion of each frame. The code indicia associated with a frame being displayed render selected answer keys operative whereby a student selects an answer, and establish an initial counting state in a counter, which is counted down as the frames of the film strip pass a projection gate in proceeding to the next frame to be viewed. When the counter reaches a predetermined minimum counting state, dependent on the particular answer key selected by the student, the film strip is stopped and the next frame is viewed. An alternate mode of operation is provided wherein fixed excursions of a predetermined number of frames occur for each answer key. A dynamic reading method is employed for reading code indicia on the film strip to reduce the number of photodetectors required. A performance memory is provided for branching to advanced material after a predetermined number of correct answers, and a no-go circuit is provided for discouraging frivolous or improper depression of answer keys. The film transport includes a self-threading feature, and operates at two speeds to reduce excursion time and to provide a smooth controlled stop sequence. A novel cassette-type supply reel provides automatic mode selection, and novel reel hub assemblies provide for bidirectional film movement with a single bidirectional drive motor.

3 Claims, 16 Drawing Figures

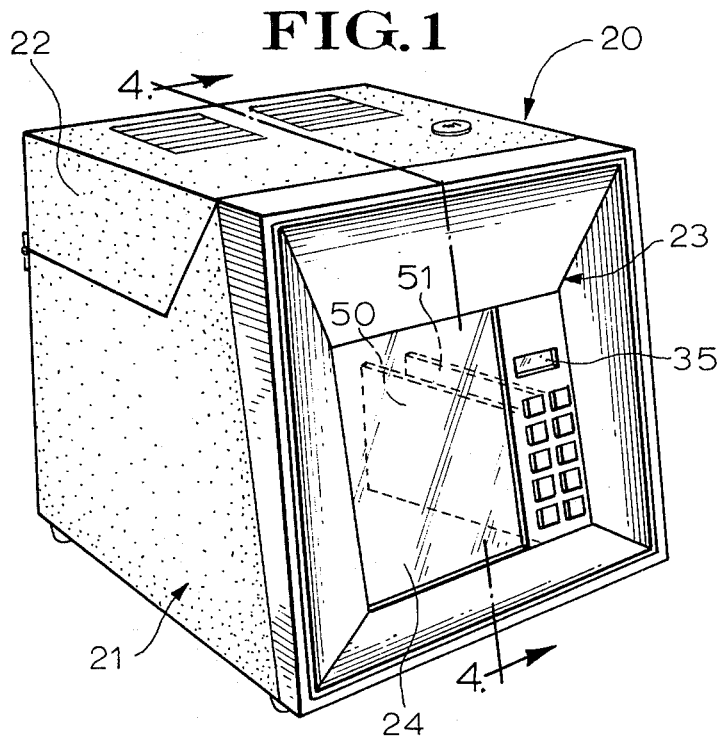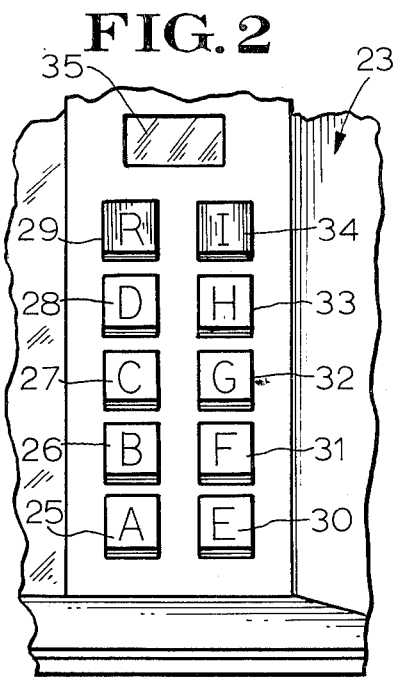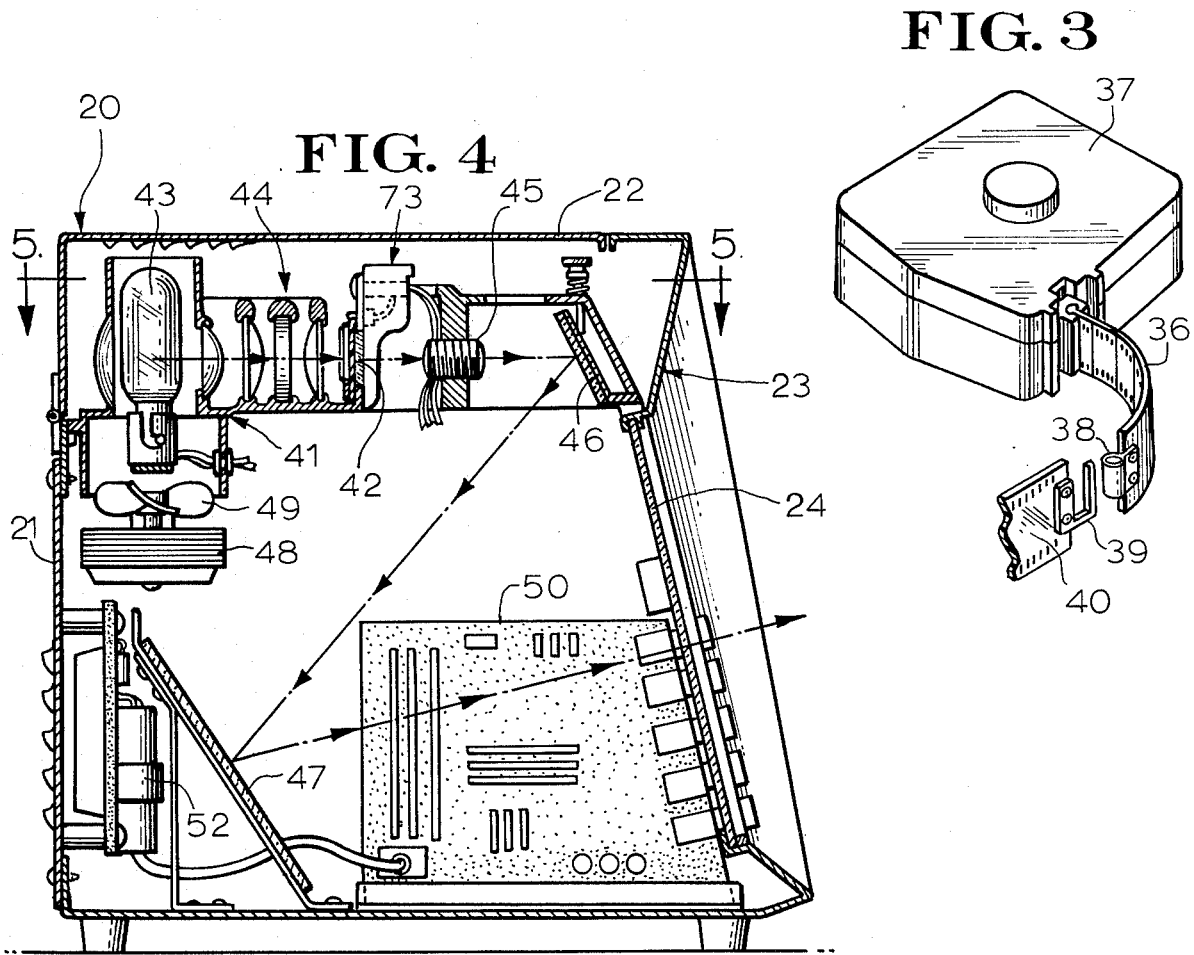

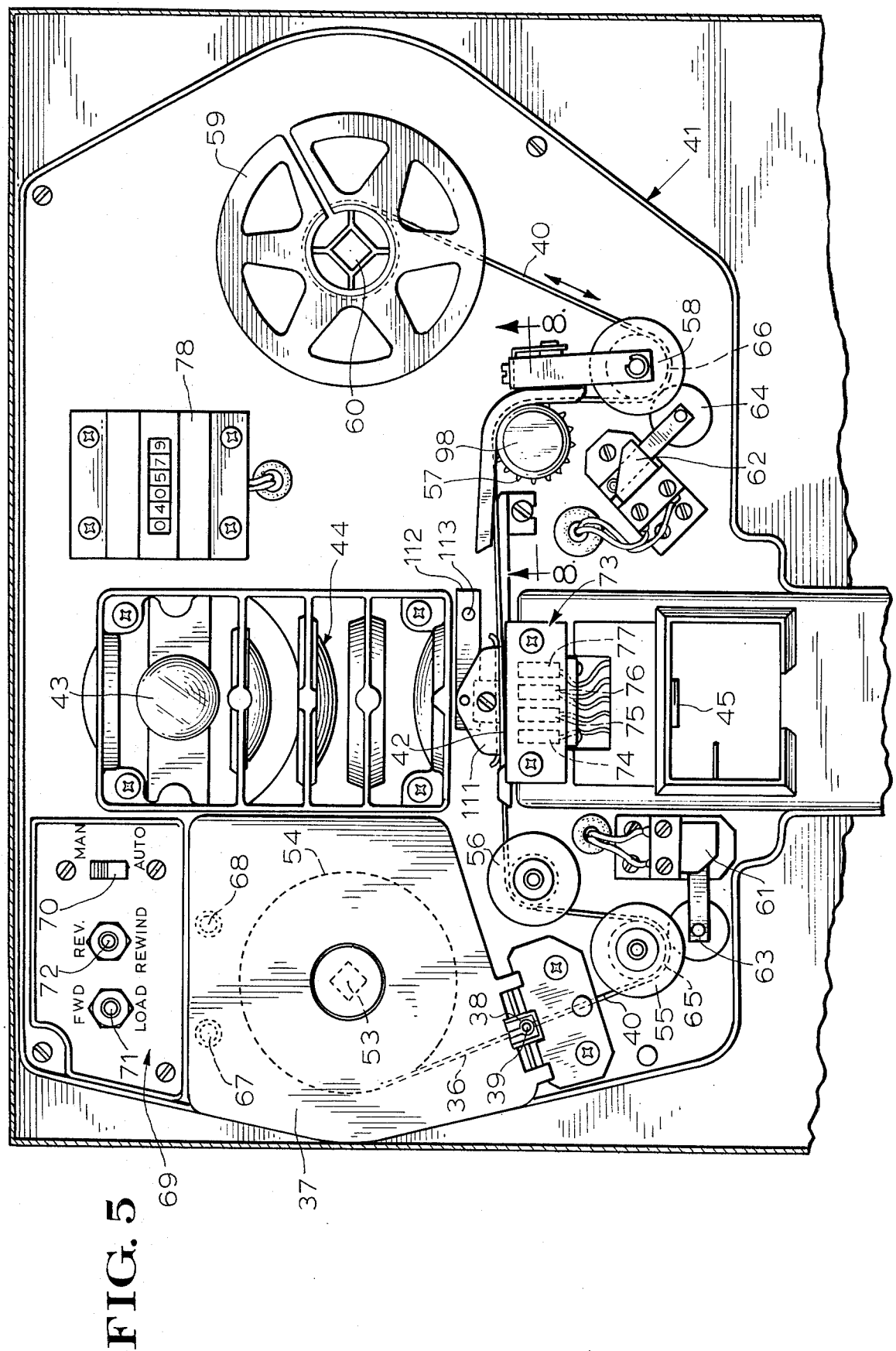

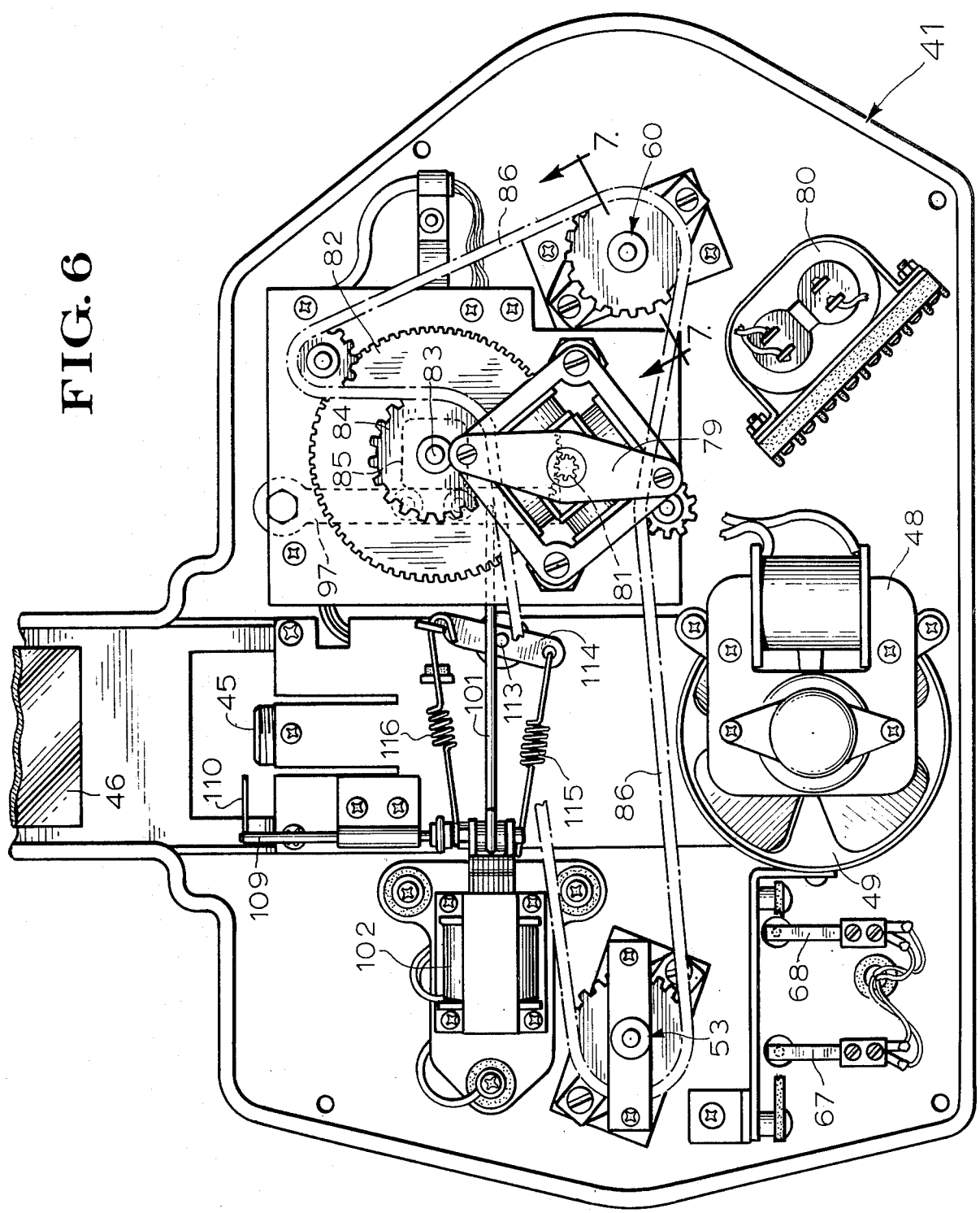

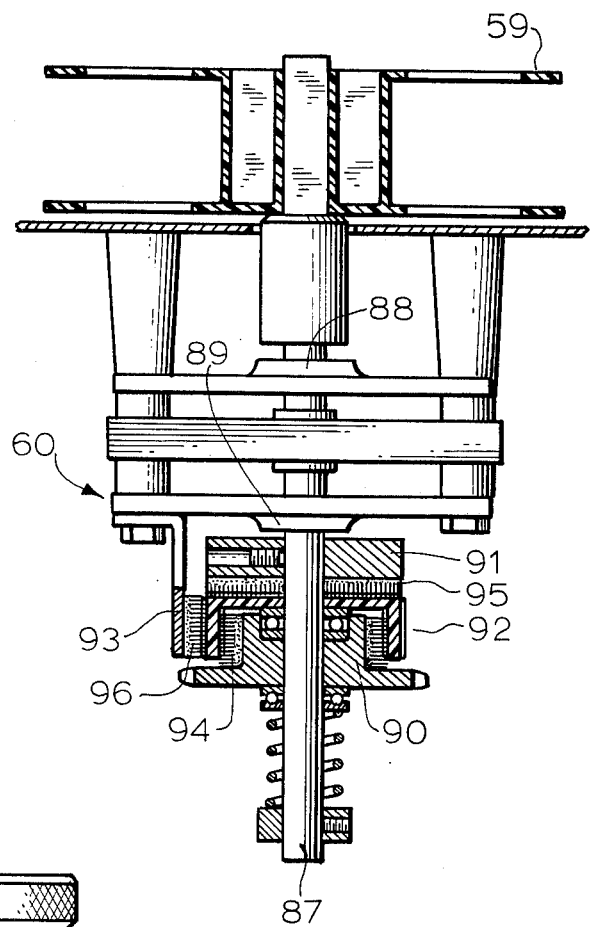
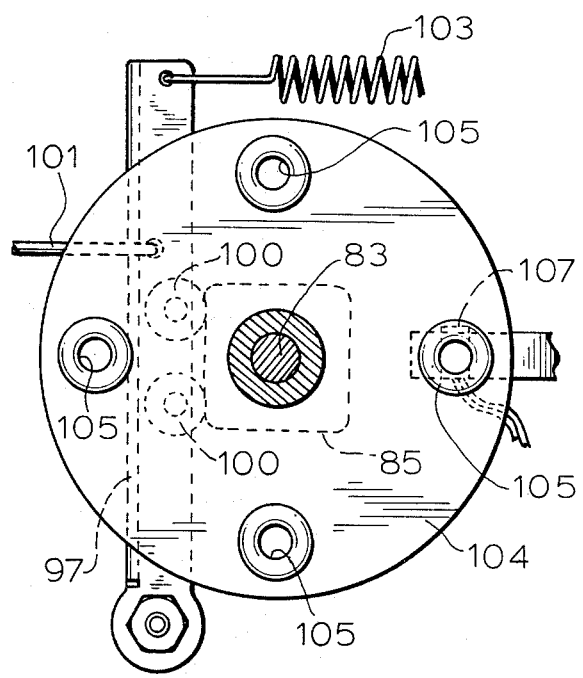
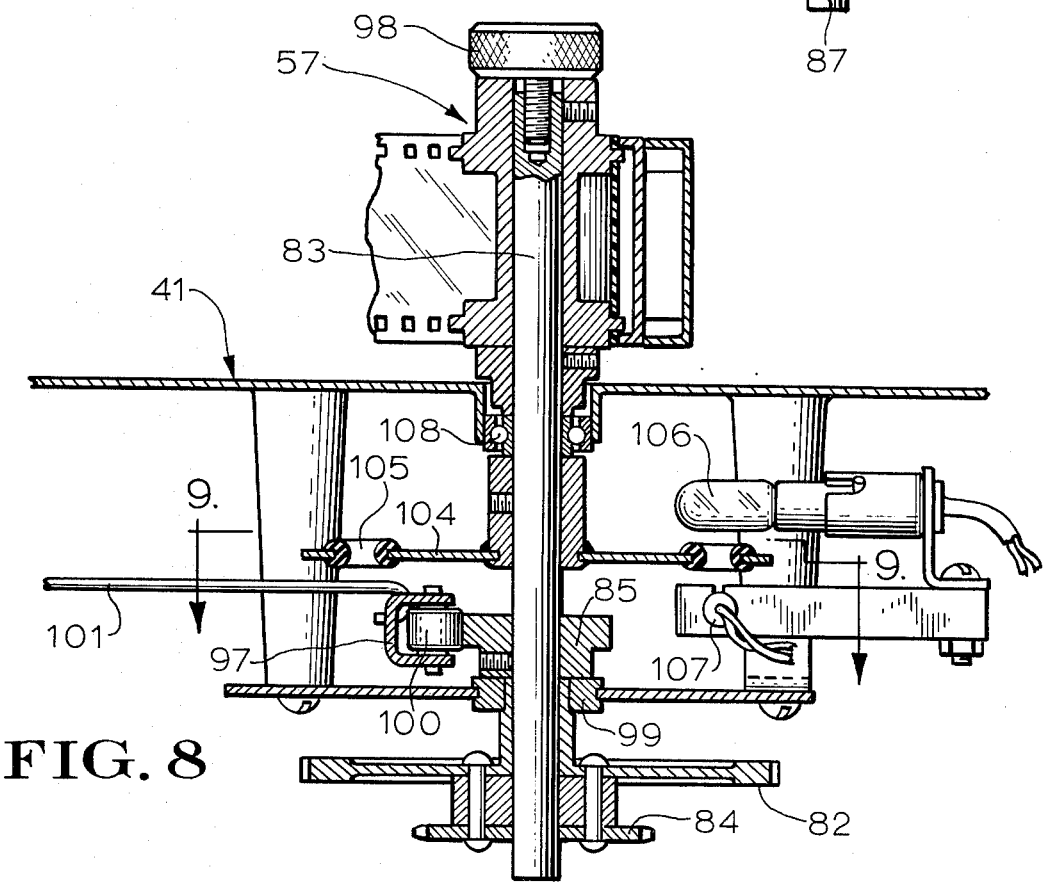

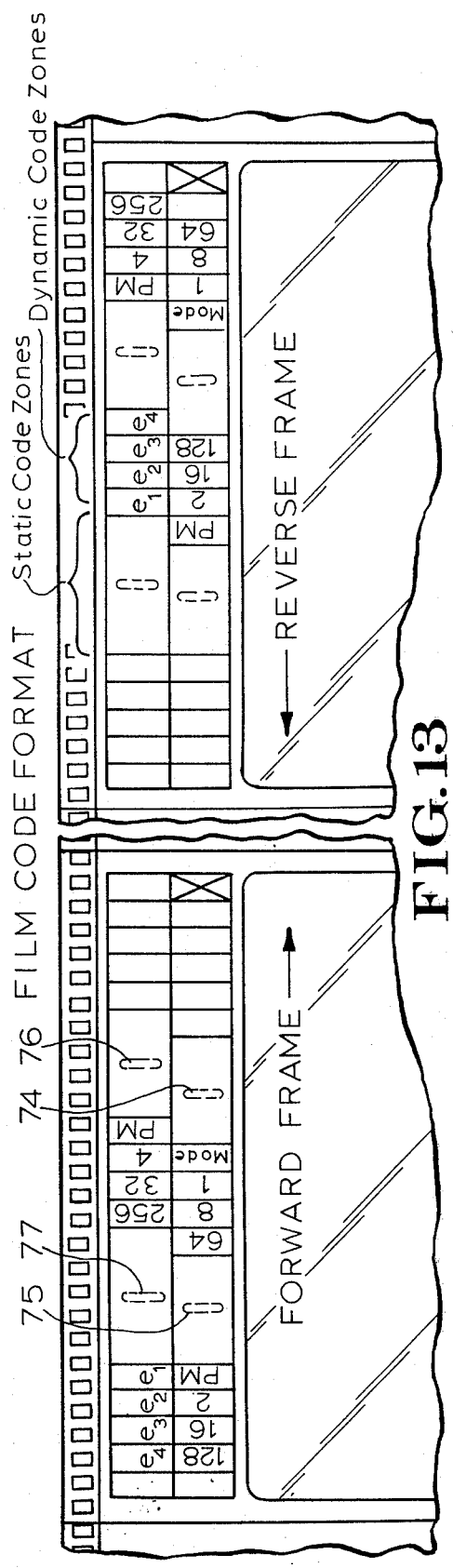

TEACHING MACHINE

BACKGROUND OF THE INVENTION

This application pertains in general to an information presentation system, and more particularly to a teaching machine system which presents lesson material to a student at a pace dependent on his ability to learn.

In recent years teaching machines have been developed for use in schools and industry as a means of providing individualized instruction which would otherwise not be possible because of lack of classroom facilities or qualified instructors. Such instruction may be remedial in nature, allowing slower students to review material without slowing down their classes, or advanced in nature, allowing faster students to cover material which would not otherwise be covered. In either case, to approach the effectiveness of individual tutoring by an instructor, teaching machines must be capable of being intrinsically programmed, i.e. the student's responses must be able to be utilized to control subsequent presentations. It is only when new information is selected on the basis of a previous answer or a series of answers made by the student that a degree of effectiveness compared with individual tutoring is possible.

Instructional material in intrinsically programmed teaching machines is preferably presented in visual form from a strip of film, individual frames of which are projected one at a time onto a viewing screen in front of the student. A plurality of answer keys is provided for recording the student's answers to questions which may appear on the screen, and if desired an audio presentation may be given concurrently with the visual presentation. Typically, a small portion of text material relating to the subject under study is presented to the student in each frame, often with a question and a plurality of multiple-choice answers. After studying the question, the student depresses one of the answer keys to indicate his answer. If his answer is correct, the next frame presented to the student provides additional information to further his progress. If the answer is incorrect, a "branch" is made in the instructional program and a new frame is presented to the student advising him of his error and providing him with further instruction and directions to follow before he can proceed in the program. For example, a student choosing a wrong answer may, upon the next frame being presented to him, be directed to return directly to the preceeding frame and choose another answer. Or, he may be directed to proceed to a succession of different frames for added coaching before being directed to return to the frame at which he selected the wrong answer.

Typically, prior art teaching machines of the above-described type, i.e. those utilizing intrinsic, or branch, programming in connection with a multiple frame film strip, have either been unduly large, complex and expensive, or have been hampered in their presentation of instructional material by inherent programing limitations. For example, one prior art machine utilized a search technique whereby the address of the subsequent frame to be displayed was read from code indicia on the frame being viewed. The film strip was then placed in motion and the stored address compared with address codes on each passing frame until the desired frame was reached, at which time the film strip was stopped and the desired frame displayed. Unfortunately, this required a large number of optical encodements on each frame, which necessitated that the encodements be kept smaller than desirable for reliable performance, allowing even a minor irregularity on the film to cause the search operation to miss the desired frame and continue on to the end of the film strip. Furthermore, the need for frame-by-frame code comparison necessitated that the film run relatively slowly, undesirably increasing the time between displays.

Another prior art teaching machine required that the film strip move a fixed number of frames upon depression of an answer key prior to displaying the next frame. The excursion was different and fixed for each answer key, so that the material presented on the next frame depended on the answer selected. While being less complex than the aforementioned search-type machine, the presentation of instructional material was sometimes limited by programming limitations. For example, in complex programming situations the fixed excursion format occasionally precluded certain desired presentation formats, and often made it necessary for the student to make multiple selections before being presented with the next frame of instructional material. While the flexibility of this machine could be increased by providing a larger number of selection keys and related excursions, this necessarily complicated the selection task of the student and increased the cost and complexity of the machine.

Accordingly, it is an object of the present invention to provide a new and improved teaching machine system.

It is a more specific object of the present invention to provide a new and improved teaching machine system which offers increased flexibility and improved reliability.

It is a still more specific object of the present invention to provide a new and improved teaching machine system wherein the next frame to be viewed is rapidly positioned without the need for a frame-by-frame address comparison.

It is still another specific object of the present invention to provide a new and improved multi-mode teaching machine wherein the instructional film strip is contained within a cartridge, and the operating mode of the machine is automatically established upon insertion of the cartridge.

It is another specific object of the present invention to provide a new and improved teaching machine which requires a minimum number of detectors for reading code indicia on the instructional film strip.

It is another specific object of the present invention to provide a new and improved teaching machine which requires fewer code indicia on the instructional film strip.

It is another specific object of the present invention to provide a new and improved teaching machine which provides improved handling of the instructional film strip when presenting frames for viewing to the student.

It is another specific object of the present invention to provide a new and improved multiple-mode teaching machine system which operates in a primary variable-excursion mode wherein information for locating the next frame to be viewed is contained on the frame being viewed, or in a secondary fixed-excursion mode wherein the film is advanced a fixed number of frames dependent on the answer selected, with a minimum number of additional components.

It is another specific object of the present invention to provide a new and improved teaching machine which provides for the presentation of alternate material following a predetermined number of selected correct or incorrect responses by a student.

It is another specific object of the present invention to provide a teaching machine wherein only those answer keys representing valid responses to a displayed question are rendered operative to advance the film strip.

It is another specific object of the present invention to provide a teaching machine wherein all answer keys are disabled for a predetermined period of time following actuation of an answer key representing a non-valid response to a displayed question.

SUMMARY OF THE INVENTION

Accordingly, one aspect of the present invention is generally directed to a teaching machine for displaying selected frames from a multiple frame film strip wherein instructional material is contained on first portions of the frames, and code indicia, including an excursion instruction for proceeding to a subsequent frame to be displayed, is contained on a second portion of the frames. The teaching machine comprises means including a projection gate for displaying the first portion of individual ones of the frames when aligned in said projection gate, and transport means for moving the film strip to position a selected one of the frames in the projection gate, and means including first and second answer keys for recording answers to a question included in the instructional material. Also included is a counter responsive to applied pulses for counting down from an initial counting state, and means for entering the excursion instruction into the counter to establish an initial counting state therein. The teaching machine further comprises commutator means for generating pulses to count the counter down from the initial counting state as the frames of the film strip pass the projection gate, and means for stopping the motion of the film strip to display a first subsequent frame when the counter reaches a first predetermined minimum counting state following actuation of the first answer key, and for stopping the transport to display a second subsequent frame when the counter reaches a second predetermined minimum counting state following actuation of the second answer key.

Another aspect of the present invention is generally directed to a teaching machine for displaying selected frames from a multiple frame film strip wherein instructional material, in the form of a question and a plurality of answers thereto, only one of which is correct, is contained on a first portion of the frames, and code indicia, including an excursion instruction for proceeding to a subsequent frame to be displayed, is contained on a second portion of the frames. The teaching machine comprises means including a projection gate for displaying to an operator the first portion of individual ones of the frames when aligned in the projection gate, a transport mechanism for moving the film strip to position selected ones of the frames in the projection gate, and means including plurality of answer keys corresponding to respective ones of the answers to the question. Also included is a counter responsive to applied pulses for counting down from an initial counting state, means for entering the excursion instruction into the counter to establish an initial counting state therein, and means responsive to the motion of the film strip for generating pulses to count the counter down from the initial counting state as the frames of the film strip pass the projection gate. Means are further provided for stopping the film transport to display a first subsequent frame when the counter reaches a first minimum counting state following actuation of the answer key corresponding to the correct answer to the question, and for stopping the film transport to display a second and different subsequent frame when the counter reaches a second and different minimum counting state following actuation of any of the remaining answer keys corresponding to incorrect answers to the question.

Another aspect of the present invention is generally directed to a teaching machine for displaying selected frames from a multiple frame film strip wherein instructional material, in the form of a question and at least first and second answers thereto, the second answer comprising a selected response, is contained on a first portion of the frames, and code indicia, including an excursion instruction for proceeding to a subsequent frame to be displayed, is contained on a second portion of the frames. The teaching machine comprises means including a projection gate for displaying the first portion of individual ones of the frames when aligned in the projection gate, film transport means for moving the film strip to position selected ones of the frames in the projection gate, and means including first and second answer keys for recording selection of the first and second answers, respectively. Also included is a counter responsive to applied pulses for counting down from an initial counting state, and means for entering the excursion instruction into the counter to establish an initial counting state therein. Means responsive to the motion of the film strip are provided for generating pulses to count the counter down from the initial counting state as the frames of the film strip pass the projection gate, as are means for stopping the film transport to display a first subsequent frame when the counter reaches a first minimum counting state following actuation of the first answer key, and for stopping the transport to display a second subsequent frame when the counter reaches a second minimum counting state following actuation of the second answer key, and for alternately stopping said film transport to display a third subsequent frame when the counter reaches a third minimum counting state following actuation of the second answer key when actuation of the second answer key constitutes completion of a predetermined number of selected responses.

Another aspect of the present invention is generally directed to a teaching machine for displaying selected frames from a multiple frame film strip wherein instructional material is contained on a first portion of the frames, and code indicia including an excursion instruction for proceeding to a subsequent frame to be displayed, is contained on a second portion of the frames. The teaching machine comprises means including a projection gate for displaying the first portion of individual ones of the frames when aligned in the projection gate, a transport mechanism for moving the film strip from a first position relative to the projection gate wherein a first selected frame is displayed to a second position relative to the projection gate wherein a second selected frame is displayed, and means comprising a reading station having at least one detector responsive to the code indicia on the first selected frame for generating an output signal indicative of the excursion instruction as the film strip moves from the first position to the second position. Also included is a counter responsive to an applied signal for counting down from an initial counting state, translating means for applying the output signal from the detector to the counter to establish an initial counting state therein, and means responsive to the motion of the film strip for generating pulses to count the counter down from the initial counting state as the frames of the film strip pass the projection gate. Means are also included for stopping the film transport when the counter reaches a predetermined minimum counting state to display the second selected frame.

Another aspect of the present invention is generally directed to a teaching machine for displaying selected frames from a multiple frame film strip wherein instructional material is contained on a first portion of the frames and code indicia, including first and second operating instructions indicative of a subsequent frame to be displayed, are contained on a second portion of the frames. The teaching machine comprises including a projection gate for displaying the first portion of individual ones of the frames when aligned in the projection gate, a transport mechanism for moving the film strip from a first portion relative to the projection gate wherein an initial frame is displayedto a second position relative to the projection gate, means for reading the first operating instruction from the film strip as the initial frame is positioned in the projection gate, and means for reading the second operating instruction from the film strip as the film strip moves from the first position to the second position. Means responsive to the first and second operating instructions are also provided for controlling the transport mechanism to cause the subsequent frame to be positioned in the projection gate in the second position of the film strip.

Another aspect of the present invention is generally directed, in a teaching machine of the type which displays selected frames from a multiple frame film strip wherein instruction material is contained on a first portion of the frames and code indicia, including an excursion instruction for proceeding to a subsequent frame to be displayed, is contained on a second portion of the frames, to a film transport which comprises means including a projection gate for displaying the first portion of individual ones of the frames when aligned in the projection gate, a supply reel for storing the film strip in a rewound position, a take-up reel for receiving the film strip, and film drive means for advancing the film strip from the supply reel, through the projection gate, and onto the take-up reel. The film transport further comprises a permanent leader comprising in length a plurality of frames and extending in a home position from a point of engagement with the film strip through the projection gate to the take-up reel, the frame of the leader then in the projection gate being a predetermined number of frames from the first viewing frame of the film strip and having a related initial excursion instruction on the leader, and automatic loading means responsive to the initial excursion instruction for causing the film drive means to advance the leader the predetermined number of frames from the home position to position the first viewing frame of the film strip in the projection gate.

Another aspect of the present invention is generally directed to a teaching machine for displaying selected frames from a multiple frame film strip wherein instructional material is contained on a first portion of the frames, and code indicia, including an excursion instruction for proceeding to a subsequent frame to be displayed, is contained on a second portion of the frames. The teaching machine comprises means including a projection gate for displaying the first portion of individual ones of the frames when aligned in the projection gate, and a transport mechanism for moving the film strip from a first position relative to the projection gate wherein a first selected frame is displayed to a second position relative to the projection gate wherein a second selected frame is displayed. The teaching machine further comprises means including first and second answer keys for recording answers to a question included in the instructional material, one of the answer keys corresponding to a selected response to the question, and means comprising a performance memory responsive to actuation of the answer key corresponding to the selected response for directing the film transport to position an alternate subsequent frame in the projection gate following a predetermined number of selected responses.

Another aspect of the present invention is generally directed to a teaching machine for displaying selected frames from a multiple frame film strip wherein instructional material is contained on a first portion of the frames, and code indicia, including an excursion instruction for proceeding to a subsequent frame to be displayed, is contained on a second portion of the frames. The teaching machine comprises means including a projection gate for displaying the first portion of individual ones of the frames when aligned in the projection gate, and a transport mechanism for moving the film strip from a first position relative to the projection gate wherein a first selected frame is displayed to a second position relative to the projection gate wherein a second selected frame is displayed. The teaching machine further comprises means including a plurality of answer keys for recording answers to a question included in the instructional material, one of the answer keys corresponding to an undesired response to the question, and circuit means for rendering at least a second one of the answer keys inoperative for a predetermined period of time following actuation of the first answer key.

Another aspect of the present invention is generally directed in a teaching machine of the type which displays selected frames from multiple frame film strip, and wherein instructional material is contained on a first portion of the frames, and code indicia comprising a plurality of individual code bits positioned to be read from a predetermined number of stationary reading zones is contained on a second portion of the frames, to a reading station comprising a plurality of photodetectors corresponding to respective ones of the reading zones, and means comprising a plurality of light pipes for optically coupling the photodetectors to their respective reading zones to transfer light from the zones to the photodetectors when the code bits being read at the zones are transparent.

Another aspect of the present invention is generally directed to a teaching machine of the type which displays selected frames from a multiple frame film strip wherein instructional material is contained on a first portion of the frames and code indicia for controlling the operation of the teaching machine is contained in either first or second formats on a second portion of the frames. The teaching machine comprises means including a projection gate for displaying the first portion of individual ones of the frames when aligned in the projection gate, a film transport including a supply hub, a take-up reel, and film drive means for advancing the film strip toward the take-up reel to position selected ones of the frames in the projection gate, means including an electric switch mounted on the film transport for conditioning the teaching machine to recognize code indicia in either the first or second formats, and means comprising a cartridge assembly for the film strip having a supply reel adapted to engage the supply hub, and a housing enclosing the supply reel and having an actuator surface for actuating the electric switch to condition the teaching machine in accordance with the code format contained on the film strip.

Another aspect of the present invention is generally directed to a teaching machine for displaying selected frames from a multiple frame film strip wherein instructional material is contained on a viewing portion of each frame. The teaching machine comprises means including a projection gate for displaying the first portion of individual ones of the frames when aligned in the projection gate, film transport means for moving the film strip to position selected ones of the frames in the projection gate, and means including first and second answer keys for recording answers to a question included in the instructional material. Also included is a counter responsive to applied pulses for counting down from a initial counting state, means for establishing first and second initial counting states in the counter upon actuation of the first and second answer keys, respectively, and means for generating pulses to count the counter down from the initial counting state as the frames of the film strip pass the projection gate. Means are further provided for stopping the motion of the film strip when the counter reaches a predetermined minimum counting state to display a first subsequent frame following actuation of the first answer key, and to display a second subsequent frame following actuation of the second answer key.

Another aspect of the present invention is generally directed to a multiple frame film strip wherein instructional material is contained on a first portion of the frames and wherein code indicia, including in a first operating mode of the machine an excursion instruction for proceeding to a subsequent frame to be displayed, is contained on a second portion of the frames. The teaching machine comprise means including a projection gate for displaying the first portion of individual ones of the frames when aligned in said projection gate, film transport means for moving the film strip to position selected ones of the frames in said projection gate, means including first and second answer keys for recording answers to a question included in said instructional material, and a counter responsive to applied pulses for counting down from a initial counting state. Means, in the first operating mode only, are provided for entering the excursion instruction into the counter to establish an initial counting state therein, and means, in the second operating mode, are provided for establishing first and second initial counting states in the counter upon actuation of the first and second answer keys, respectively. Means are further provided for generating pulses to count the counter down from the initial counting state as the frames of the film strip pass the projection gate, as are means, in the first operating mode, for stopping the film strip when the counter reaches a first predetermined minimum counting state to display a first subsequent frame following actuation of the first answer key and a second subsequent frame following actuation of the second answer key.

Another aspect of the present invention is generally directed, in a teaching machine of the type having a film transport assembly for displaying lesson material from individual frames of a multiple frame film strip, the film strip being partially wound on a bi-directionally rotatable storage reel, to a drive hub assembly for the storage reel comprising a shaft rotatably coupled to the storage reel, a driving member carried on the shaft, a coupling member carried on the shaft adjacent the driving member, and a driven member carried on and rotatably coupled to the shaft adjacent the coupling member. Means are provided for unidirectionally coupling the driving member to the coupling member such that the coupling member turns with the driving member in only one direction relative to the axis of the shaft. Also provided are braking means for inhibiting rotation of the coupling member in the other direction, and means for bi-directionally coupling the coupling member to the driven member to frictionally couple the storage reel to the drive member in the one direction, and to frictionally inhibit rotation of the shaft in the other direction.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in connection with the accompanying drawings, in the several figures of which like reference numerals identify like elements, and in which:

FIG. 1 is a perspective view of a teaching machine constructed in accordance with the invention.

FIG. 2 is an enlarged view of that portion of the front panel of the teaching machine in FIG. 1 containing the student-actuated answer keys.

FIG. 3 is a perspective view of a cassette assembly for an instructional film strip to be used in conjunction with the teaching machine of FIG. 1.

FIG. 4 is a sectional view taken along lines 4—4 of FIG. 1.

FIG. 5 is a top view of the film transport deck of the teaching machine of FIG. 1.

FIG. 6 is a bottom view, partially fragmented, of the film transport deck of FIG. 5.

FIG. 7 is a cross sectional view of the take-up reel hub drive assembly taken along lines 7—7 of FIG. 6.

FIG. 8 is a cross sectional view of the sprocket drive assembly of the film transport of FIGS. 5 and 6.

FIG. 9 is an enlarged cross sectional view taken along lines 9—9 of FIG. 8.

FIG. 12 is a tabulation of the functions of the photo detectors of the teaching machine while statically reading code indicia from the film strip.

FIG. 13 is an illustration of the layout of code indicia of the film strip.

FIG. 14 is a tabulation of the functions of the photo detectors while dynamically reading code indicia from the film strip.

DESCRIPTION OF THE PREFERRED EMBODIMENT

Figure 10:
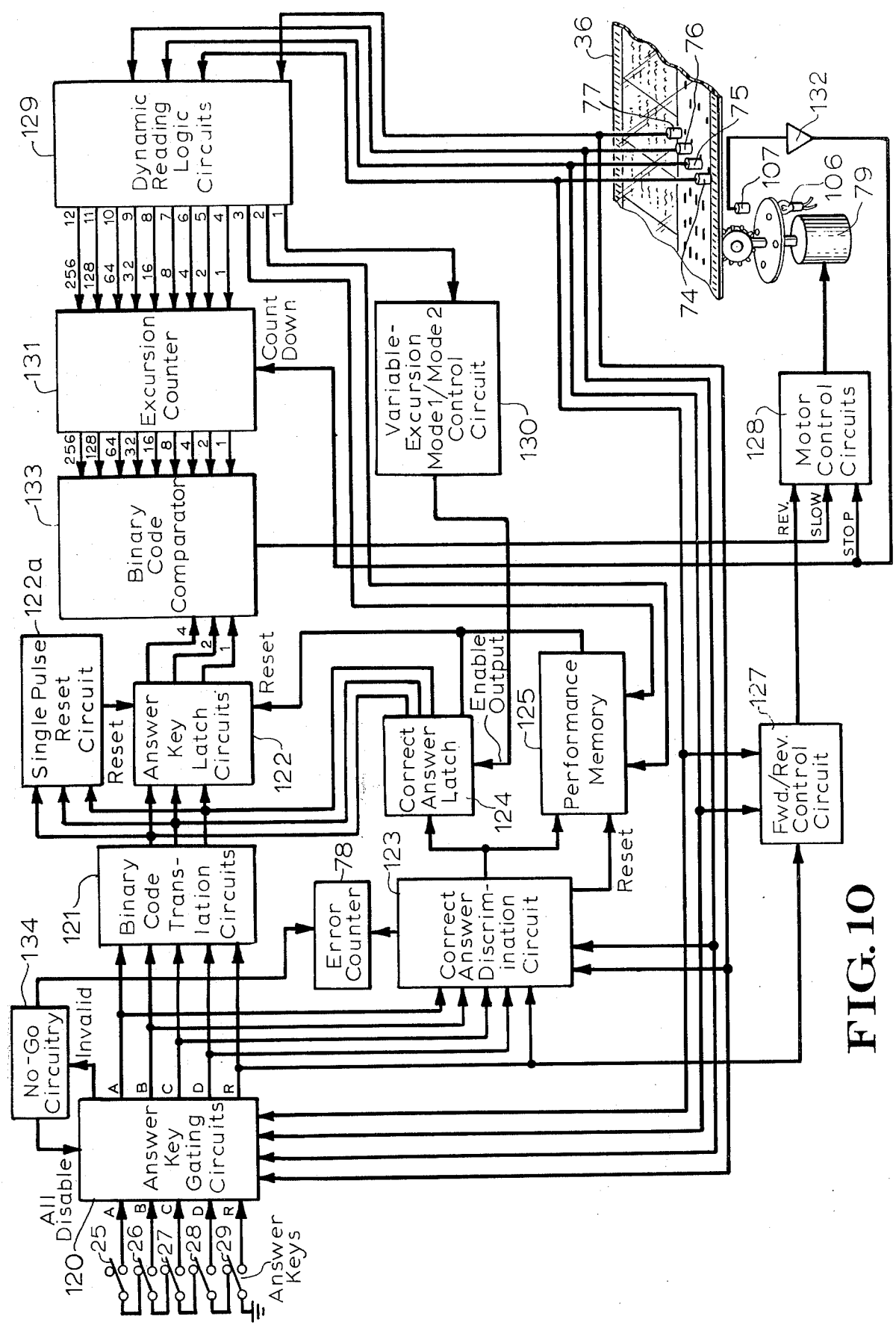
FIG. 10 is a functional block diagram of the teaching machine of FIG. 1 in its primary mode of operation.

Although it will be appreciated that the teaching machine system of the present invention can be utilized in conjunction with various types of film formats and film transport mechanisms, it finds particular utility in conjunction with a film strip transport which displays individial frames of a 35 millimeter film strip to an operator-student on a back projection viewing screen. The operation of the transport is controlled by a plurality of student-actuated answer keys, and by bits of information encoded as transparent or opaque areas on a portion of each film frame reserved for that purpose.

In operation, the student reads information presented on the screen and then answers a multiple-choice question by actuating one of four answer keys A, B, C or D provided on the front panel. The machine then moves the film strip to locate and display another frame appropriate to the selection the student has made. If the answer chosen by the student is the correct answer, the new frame will normally contain new information and another question, and the process will be repeated. If the student has chosen an incorrect answer, the frame that thereafter appears on the viewing screen will normally explain that his choice was incorrect and direct him to return by actuating a specific answer key to the original frame to choose another answer to the question.

The teaching machine illustrated herein as a preferred embodiment of the invention is capable of operating in one of three different operating modes; two variable-excursion modes 1 and 2, and a fixed-excursion mode 3. In the variable-excursion modes the excursion or distance traveled by the film strip in positioning a new frame for viewing is determined by the previous answer selected and information placed on the film strip by the programmer. In mode 1 each possible answer results in a different excursion, whereas in mode 2, the correct answers result in one excursion and the incorrect answers result in another excursion or no excursion at all. In the fixed-excursion mode 3 the excursion is fixed for each answer key and cannot be varied by the programmer. The selection of modes 1 and 2 is made by an encodement on the film strip and may change from frame to frame. The selection of mode 3 operation is made by a cassette-actuated switch and can be changed only by inserting a cartridge not programmed for fixed excursions.

In the illustrated embodiment each frame of the instructional film strip contains 20 bits of information, or encodements, which control the operation of the machine. Four of these bits are read by four photodetectors at a reading station within the machine while the film strip is stationary to determine which of five answer keys (A, B, C, D and R) are functional for the frame then in position. In general, any answer key not intended by the programmer to fill a valid program function is disabled. The four statically read bits also permit the programmer to indicate which one of the keys represents the correct answer for that frame. The latter information is necessary during mode 2 operation of the machine wherein it will be recalled that the correct answer provides one excursion to a subsequent frame to be viewed, and incorrect answers provide either a different excursion or no excursion at all. Finally, the four static bits determine which direction the film strip will move in response to actuation of the R answer key. Normally, this answer key will move the film backward. There is one condition, however, where answer key R is enabled with answer keys A–D and will move the film forward.

When a functional answer key is actuated the film is set into motion in the appropriate direction. As the previously viewed frame leaves the projection gate and passes the reading station the remaining sixteen encodement bits are dynamically read, four bits at a time, by the four photodetectors at the reading station. One bit on each group of four serves to generate a strobe pulse to insure that the other three bits of the group will be in correct alignment when they are read. The first group of bits determines in which of the variable-excursion operating modes the teaching machine will operate in that frame. In mode 1 each of the functional answer keys on a given frame will move the film to a different frame. In mode 2 the answer key designated as representing the correct answer will move the film to one frame; and all of the other answer keys, representing wrong answer choices, will move the film to a single different frame.

The first group of dynamically read bits also controls the operation of a performance memory for the particular frame. Specifically, the teaching machine includes a counter which tallies the number of consecutive correct answers given by the student. By means of the encodements on the film it can be reset and not used at all, or can be conditioned to send a student to a frame different from the one he would normally reach on his second, fourth, or seventh consecutive correct answer.

The last two groups of dynamically read code bits provide an excursion instruction for controlling the number of frames the machine will traverse in moving the film to position the next frame for viewing. This instruction, hereinafter termed the X number, is specified by the programmer and may be any number from 1 to 512. However, the answer keys, the mode of operation, and the use of the performance memory modify the actual number of frames which will be traversed. Specifically, in mode 1 operation answer keys A, B, C and D cause excursions of X-1, X-2, X-3 and X-4, respectively, and answer key R causes the film to move X frames forward or backward, depending on the previously described static encodement contained on the frame being viewed. In mode 2 operation the correct answer causes an excursion of X-1 frames forward, whereas all wrong answers cause an excursion of X-2 frames forward. In either mode, a performance branch, i.e. the program change occurring when the required number of consecutive correct answers have been recorded by the performance memory, causes the film to move X frames forward, irrespective of the particular answer key actuated in selecting the correct answer.

Basically, in the present embodiment the desired excursions are obtained by reading the X number from the frame being viewed into an excursion counter to establish an initial counting state. Then, as the film strip moves towards the next frame the excursion counter is counted down, one count per frame. When the counter reaches a predetermined minimum count, as determined by the particular answer key actuated in mode 1 operation, or whether the answer selected is the correct answer in mode 2 operation, or by the presence of an intervening performance branch in either mode, the film strip is brought to a stop and the next frame is displayed.

Referring now in detail to FIGS. 1 and 2, a teaching machine 20 constructed in accordance with the invention comprises a housing 21 having a hinged top cover 22 and a slightly inclined front panel 23 facing the student-operator. A viewing screen 24 for visually presenting lesson material to the student is contained on the left side of the front panel, and a group of ten answer keys 25-34, corresponding to answers A-D, R, and E-I, respectively, are contained along the right side. A no-go light 35, which signals that a non-operative answer key has been actuated, it also located on the front panel above the group of answer keys. Aside from providing maximum operator convenience and pleasing appearance, the above-described arrangement of the cabinet and student-operator controls will be seen to facilitate an efficient arrangement of components within the machine.

Teaching machine 20 is designed to present instructional material in film strip form, individual frames on the film strip corresponding to individual lesson units to be presented one at a time to a student using the machine. While the film strip can be contained on a standard reel, a more convenient form is that shown in FIG. 3 wherein the film strip 36 is contained on a reel (not shown) enclosed within a cartridge housing 37. One end of the film extends out through a slot in the housing and preferably terminates at a clip 38, which is adapted to engage the end clip 39 of a permanent leader 40, which aids in threading and rewinding the film in a manner to be presently described.

Referring to FIG. 4, a film strip transport deck 41 is seen to be mounted horizontally within cabinet 21 immediately beneath the hinged top cover 22. This deck functions to position a desired frame on film strip 36 within a projection gate 42, and to project the frame thus positioned onto the rear of viewing screen 24. Toward this end deck 41 includes within suitable housings a projection lamp 43, a condensor lens assembly 44, a projection lens 45, and a mirror 46. The structure and operation of these projection components is well known to the art, so that no further explanation need be given except that the positive image in gate 42 is projected downward from mirror 46 into housing 21. An additional mirror 47, mounted at an angle on the bottom of the housing, receives the projected image from mirror 46 and redirects it onto the rear of screen 24. A motor 48 and fan 49 are provided on deck 41, beneath projection lamp 43, for the purpose of cooling the projection lamp to prolong its operating life.

The electronic assemblies for the teaching machine 20 are mounted within housing 21 so as to not interfere with the projection of lesson material onto screen 24. Specifically, a pair of parallel spaced-apart printed wiring board assemblies 50 and 51 are mounted immediately behind answer keys 25-34, and a printed wiring board assembly 52 is mounted on the rear cover of housing 21, immediately behind mirror 47. Board assemblies 50 and 51 contain circuitry primarily associated with the answer keys, and board assembly 52 contains a power supply. Additional printed wiring board assemblies (not shown) are contained on deck 41.

Referring now to FIG. 5, the film transport deck 41 is seen to comprise a supply reel drive hub 53 for engaging a supply reel 54 contained within film cartridge housing 37. The film strip 36 extends through an aperture in housing 37 and engages permanent leader 40 by means of the coacting clips 38 and 39. The leader is threaded around idler wheels 55 and 56, across projection gate 42, around a sprocketed drive wheel 57, around an idler wheel 58, and onto a conventional takeup reel 59. A takeup reel hub 60 engages takeup reel 59 for the purpose of driving it during forward operation and tensioning it during rewind operation.

To insure dependable control of the film strip, and to prevent damage to the film in the event of breakage, a no-film safety switch 61 and a rewind-stop safety switch 62 are provided along the film path, on either side of viewing gate 42, adjacent idler wheels 55 and 58, respectively. These switches have roller-ended actuator arms 63 and 64, respectively, which are spring biased to extend edgewise into grooves 65 and 66, provided on idler wheels 55 and 58, respectively, beneath the path of the film strip. When the film is in place on the idler wheels groove 65 is covered and the film transport is enabled by switch 61. When the film leader 40 is in its home position, groove 66 is uncovered by reason of a slot provided in the leader and switch 62 disables the transport.

An additional film-related control function is provided by a pair of plunger-operated switches 67 and 68, which engage the bottom surface of the cartridge housing 37. The first of these, swith 67, automatically conditions the machine to the presence of a cartridge, preventing tape motion when a cartridge is not in place. The second switch 68 controls the operating mode of the machine according to the type of programming, e.g. variable-excursion or fixed-excursion, employed on the film strip contained within the cartridge. Upon depression of this switch by an appropriately positioned actuator surface on the cartridge, the machine is automatically conditioned for mode 3 operation.

A control panel 69 is provided to the left of the projection lamp housing to facilitate loading and unloading film strips from the transport deck. The panel includes a manual-auto slide switch 70, a forward-load push-button switch 71, and a reverse rewind push-button switch 72. In the manual position of switch 70 the film transport deck switches 71 and 72 operate as forward search and reverse search switches, allowing the operator while the machine is in its secondary operating mode to rapidly proceed to any frame on the film strip except when prevented from doing so by one of the film safety switches 61 or 62; the reverse-rewind switch 62 being disabled when rewind-stop safety switch closes, and the forward-load switch 61 being disabled when the no-film safety switch closes. During this search operation the film continues in motion only while the search switch is depressed.

When switch 70 is in the automatic position, the film transport is conditioned to provide for automatic loading and unloading of the instructional film strip. Specifically, when the film 36 from supply reel 54 is attached to permanent leader 40, a frame on the permanent leader, hereinafter termed the index frame, is situated in the projection gate and the rewind stop switch 62 is closed by virtue of a notch cut into the edge of the leader which allows actuator arm 64 to fall into the groove 66 provided on idler wheel 58. The index frame in the projection gate is coded to disable all answer keys except the A, B, or C answer keys. Now, when the forward-load switch 71 is momentarily actuated, the A answer key is electrically actuated and an X number is read from the index frame into the excursion counter. This X number causes the leader to be advanced, together with the film strip attached thereto, a predetermined number of frames until the first viewing frame, of the instructional film strip is positioned in the projection gate. It is intended that all instructional film strips will have a standard number of frames between their end which engages the permanent leader and their title frame so that the X number on the permanent leader can be constant for all film strips.

Should the forward-load switch 71 be actuated without film from the supply reel being connected to the permanent leader, the machine will begin a normal stop cycle as soon as the end of the permanent leader clears idler wheel 55 and allows no-film switch 61 to close. This occurs because when the no-film switch is closed, the film drive can operate only in reverse, stopping the forward load cycle. Of course, the instructor can restore normal operation by either actuating the rewind switch, which will cause the permanent leader to automatically return to its home position in a manner next to be described, or by setting switch 70 in its manual position and actuating reverse-rewind switch 72 until the leader has returned to its home position.

The film transport also includes an automatic rewind function which is activated when the reverse-rewind switch 72 is actuated with switch 70 in its automatic position. This causes the film drive motor to run in reverse at full speed until the rewind-stop stop safety switch 62 closes, at which time a normal stop cycle is initiated; the motor switching to slow speed and stopping completely on receipt of the next frame count pulse. The rewind-stop safety switch is actuated by a notch cut into one edge of permanent leader 40 at a point where it overlies idler 58 when in its home position, as shown in FIG. 5. Allowance is made for the distance required to bring the leader to a complete stop by extending the notch forward along the leader, toward take-up reel 59.

Film transport 41 has two film speeds; run, nominally 17 frames per second, and slow, nominally 2 frames per second. When an operating cycle is initiated by pressing a functional answer key the film strip is driven at the run speed toward the next frame to be displayed and the dynamically read encodement bits are read. As each frame of the film strip passes the projection gate, a count pulse is generated which drives the counter previously loaded with the X number down one count toward 0. When the counter has reached a predetermined minimum count of either 4, 3, 2, 1 or 0, depending on which answer key was last actuated, the counter generates a "ready to stop" signal which initiates a stop sequence wherein the film transport is again switched to its slow speed. This acts as a brake on the film, slowing it down 1 1/6 frames from the desired position. At the time the next count pulse is generated, the film is 1/6 frame from the desired position, and a stop signal is generated. The inertia of the film drive system and a mechanical detent to be presently described drive the film the remaining 1/6 frame to the projection gate. The fact that the film moves one additional frame after the counter has given the "ready to stop" signal necessitates that the excursion counter actually be initially established with a counting state of X-1, rather than X.

The film transport further includes a code reading station 73 positioned above projection gate 42. Basically, this station comprises four photodetector elements 74-77 for detecting encodements in the form of opaque or transparent bits contained on an assigned portion of the film frame in the projection gate. The detailed arrangement of these code indicia and their interaction with the photodetectors will be covered in detail presently. An electromechanical error counter 78 is located to the right of the projection lamp housing for the purpose of recording the cumulative number of errors made by a student-operator.

Referring now the underside of the film transport, as shown in FIG. 6, a single bidirectional drive motor 79 is provided for driving the film. This motor is preferably a splitphase AC type motor, and requires an external capacitor 80 in series with one or more of its windings for proper operation. The motor carries a small gear 81 on its shaft, which coacts with a much larger gear 82 on a film sprocket drive shaft 83 to obtain a net reduction in rotation speed and an increase in effective torque. A chain sprocket wheel 84 and a four-sided indexing cam 85 are also carried on this shaft.

Sprocket wheel 84 engages a continuous loop chain 86 (fragmented in FIG. 6) which translates power from motor 79 to the film supply and take-up drive hubs, 53 and 60, respectively. As shown in FIG. 7, the take-up hub assembly 60 consists of a central shaft 87 rotatably supported by two spaced-apart bearing assemblies 88 and 89. A novel bi-directional clutch arrangement is employed in the hub to couple the chain to the shaft while the film is moving forward, and to de-couple the chain and apply a counteracting drag to the shaft while the film is being rewound. This clutch arrangement comprises a sprocketed chain drive driving member 90 carried on but not rotatably coupled to shaft 87, a driven member 91 rotatably coupled to shaft 87, and a cup-shaped coupling member 92 carried on but not coupled to shaft 87. Braking means comprising a brake shoe 93 are disposed adjacent one edge of coupling member 92 for the purpose of preventing that member from turning in a counter-clockwise direction.

The chain-driven driving member 90 contains an integral hub portion which extends into the cup-shaped recess of the cup-shaped coupling member 92. To achieve a unidirectional coupling between clutch members 90 and 92, a linear 94 having a carpet-like bristled surface is fastened about the circumference of the hub portion. A plurality of sawtooth-like serrations, presenting inclined faces towards the bristles during rewind and flat opposing faces during forward motion of the film, are molded into the inside circumference of member 92 to coact with the bristles of liner 94 in obtaining the desired clutch action. When the serrations face the direction of rotation, the bristles are engaged by the serrations and the two opposing surfaces are tightly coupled. Conversely, when the serrations are inclined in the direction of rotation, the bristles are not engaged and the opposing surfaces remain uncoupled.

Coupling member 92 is coupled to the disc-shaped driven member 91 of the clutch assembly by means of coaction between a bristled liner 95 carried on the opposing face of member 91 and a plurality of serrations on the adjacent face of member 92. This coupling is bidirectional and fractional, being intended to slip when the applied torque in either direction exceeds a predetermined maximum.

Sawtooth-like serrations are also molded into the outside surface of coupling member 92 to engage a bristled surface lining 96 on brake shoe 93. These serrations are oriented to oppose clockwise rotation (as viewed from the top of the deck) of coupling member 92, causing member 92 by way of its frictional coupling to member 91 to introduce resistance against clockwise rotation of shaft 87. This is desirable, since a controlled amount of friction during rewind causes the film to be more evenly wound on the supply spool. During forward motion of the film the brake has no effect, the hub being driven by way of nmembers 90, 92, and 91. The frictional coupling between members 91 and 92 protects the film against breakage should it become jammed and allows manual positioning when the transparent is not in operation. The hub assembly 53 for the supply reel is identical in design and construction, except that the directions of rotation are reversed. That is, the hub must drive during reverse motion of the film strip and must drag during forward motion of the film strip.

Returning to FIG. 6, the four-sided sprocket indexing cam 85 is provided on capstan shaft 83 to center the frame to be displayed in the projection gate. To this end a pivotally mounted centering bar 97 is positioned so as to bear against one of the four edges of cam 85 when the frame is centered. The bar is spring biased against the cam with sufficient force to rotate the cam into alignment should one of the four edges of the cam not square-up with the bar, and in so doing to align the frame to be viewed in the projection gate. This is possible because the sprocket drive moves exactly four frames of film past the projection gate for each revolution, and once one frame has been aligned it necessarily follows that the other frames on the film will be aligned. To position the first frame accurately, the sprocketed film drive wheel 57 can be rotatably de-coupled from its shaft 83 by loosening a retainer cap 98 (FIG. 5) which is threaded onto shaft 83 to hold the drive wheel in position. The film strip is then moved into exact alignment, and the retainer cap is retightened.

The centering assembly is better seen in FIGS. 8 and 9, which depict cross-sectional and top views of the film drive assembly, respectively. The chain-drive sprocket wheel 84 is mounted on drive shaft 83 near its bottom end. Next is mounted the larger gear 82 which engages a gear on the motor, and then a conventional bearing assembly 99 for supporting the shaft in proper alignment. The four sided cam 85 is next rotatably mounted on shaft 83. Centering bar 97 is seen to be channular in cross-section and to include a pair of rollers 100 disposed along the channel to together bear against centering cam 85. Rollers 100 are held in position by means of pins which engage appropriately positioned apertures on the side walls of lever 97. To allow the film to move, lever 97 is retracted from engagement with cam 85 during run and rewind by an actuator rod 101 connected to the free end of arm 97. This rod is in turn connected to the armature of a solenoid 102 (FIG. 6) which retracts sufficiently when energized to completely withdraw the centering arm from engagement with cam 85. Tension spring 103 is attached to the free end of centering arm 97 to bias that arm into engagement with cam 85. When solenoid 102 is engaged, it pulls against spring 103 to retract arm 97 from contact with cam 85, which necessarily turns as the film is advanced or rewound.

A frame counting means in the form of an optical commutator is also carried on shaft 83 for the purpose of registering the passage of frames past the projection gate. Basically, this commutator comprises a frame counting wheel 104 having four equispaced apertures 105 about its perimeter. The counting wheel 104 is aligned so that the apertures pass between a light source 106 and a photodetector 107, the latter providing an output pulse for each frame passage. Since four frames pass with each revolution of the sprocket drive, and four pulses are produced by photodetector 107 for each revolution of counting wheel 104, the number of pulses produced equals the number of frames which have passed the projection gate. These pulses are utilized in controlling the excursion of the film transport to a frame to be subsequently displayed in a manner which will be explained in detail presently. The apertures 105 may be reduced in size, as by adding a grommet or similar opaque element within the apertures, to provide counting pulses of shorter duration when necessary. An additional ball bearing assembly 108 may be provided for shaft 83 immediately adjacent the top plate of the film transport 41.

Referring again to FIG. 6, solenoid 102 is seen to perform additional functions besides disengaging centering lower 97 from cam 85. Specifically, the armature of solenoid 102 is coupled to one end of a flag operator member 109 which positions an opaque flag 110 in front of projection lens 45 while solenoid 102 is energized. This prevents images on the film strip from being displayed while the film is in transit.

While being displayed the film strip is held against projection gate 42 by a pressure plate 111. The purpose of this plate is to hold the displayed frame flat in the projection gate so that it can be uniformly focused on display screen 24, and to prevent any movement of the film strip which would degrade the projected image. To these ends, the pressure plate is flared upwardly at either end to receive the film strip, and includes a centrally located aperture through which the frame is projected and the accompanying code indicia are optionally read. As shown in FIG. 5, the film pressure plate is pivotally mounted on an arm 112 which in turn is mounted on a shaft 113 which extends through the top plate of the deck. Referring now to FIG. 6, a bell crank 114 is attached to shaft 113 beneath the deck. One end of this bell crank is biased in a clockwise direction (viewed from below the deck) by a tension spring 115, and the other end is connected by a second tension spring 116 to the armature of solenoid 102. When solenoid 102 is energized, it applies a counter-clockwise moment to shaft 113 which overcomes the clockwise moment of spring 115 and rotates shaft 113, causing the film to be released from projection gate 42. Thus, solenoid 102 accomplishes three functions; it centers the frame being displayed in the projection gate, it blacks out the projected image, and it releases the film strip from the projection gate.

Having considered the operation and structure of film transport deck 41, the operation and structure of the teaching machine as a system will now be considered. It will be recalled that lesson material is presented to the operator-student one item at a time, each item being contained on a separate frame of the sprocketed film strip. Also, each frame of the film strip has associated with it code indicia which are utilized by the machine in determining its operating mode, which of its answer keys will be functional and the direction in which the film will move.

Referring now to FIG. 10, which illustrates the functional stages of the teaching machine conditioned for either of the variable-excursion modes, the film strip 36 is shown in position in projection gate 42, its data portion being presented to a student and its code indicia portion being aligned with photodetectors 74-77 in the code reading station 73. As mentioned previously, these photodetectors operate initially in a static reading mode, before the film moves, and then in a dynamic reading mode after the film strip has begun to move. In the static mode the outputs of the four photodetectors are applied to answer key gating circuits 120 wherein they are utilized to enable selected ones of the answer keys in accordance with the code carried on the film. This necessitates that the outputs of each of answer keys 25-29, which corresponds to answers A-D and R, be applied to gating circuits 120 prior to being applied to the other control circuitry of the teaching machine. The answer keys may be single-pole double-throw push-button switches, the normally open contacts of which are utilized as outputs and are connected to gating circuits 120.

The particular answer keys which are rendered operative depend on the coding on the film strip, a possible coding for which is shown by way of example in FIG. 12. In this example the number of keys which will be operative is determined by the static condition, i.e. lit or unlit, of the first two photodetectors 74 and 75 while the film is at rest. A lit condition, henceforth termed a (1), occurs when a transparent encodement occupies the appropriate position, and an unlit condition, henceforth termed a (0), occurs when an opaque encodement occupies the same position. Considering the two photodetector outputs as generating a binary number, with detector 75 the least significant digit, a binary 0 (00) output from detectors 74 and 75 causes only one key to be operative, a binary 1 (01) two keys, a binary 2 (10) three keys, and a binary 3 (11) four keys. Where only one key is operative, the particular key to be operative is determined by the static reading of the third and fourth photodetectors. Considering photodetector 77 the least significant digit, a binary 1 (01) output from these photodetectors indicates the A key, a binary 2 (10) the B key, a binary 3 (11) the C key, and a binary 0 (00) the D key. Where more than one key is designated functional by the first two photodetectors, the keys are made operative in ascending order. Thus, if two keys are to be operative it will always be the A and B keys, and if three keys are to be rendered operative it will always be the A, B and C keys.

The five outputs of gating circuits 120, representing the five potentially operative answer keys 25-29, are applied to binary code translation circuits 121 wherein a unique three digit binary code is formed for each of the possible answers. By way of example, in the illustrated system the A answer key produces a binary 1 (0001), where (0) and (1) represent so-called binary low and high states, respectively. The B answer key produces a binary 2 (0010), the C answer key a binary 3 (0011), and the D answer key a binary 4 (0100).

The three digit binary number thus formed is applied to answer key latch circuits 122, wherein it is held in memory for the duration of the operation cycle, notwithstanding that the depressed answer key has been released. Previously entered information in this memory is erased at this time by reason of a single-pulse reset circuit 122a, which applies a short reset pulse to latch circuits 122 upon actuation of any one of the answer keys. The reset pulse is shorter than the set pulse from the translation circuits 121, so that old information is erased and new information is entered during each entry cycle.

The static reading of photodetectors 76 and 77 is also applied to correct answer discrimination circuits 123, which decode the applied signals with appropriate internal logic circuitry to determine which of the enabled answer keys represents a correct answer to the presented question. Specifically, and as shown in FIG. 12, a binary 1 (01) reading from these photodetectors designates A as the correct answer, a binary 2 (10) designates B, a binary 3 (11) designates C, and a binary 0 (00) designates D.

When the answer key actuated by the student corresponds to the designated correct answer, the correct answer discrimination circuits 123 produce an output which is applied to a correct answer latch circuit 124 and a performance memory 125. It will be recalled that in the secondary operating mode of the machine the correct answer latch circuit causes the machine to display one frame following a correct answer, and another frame following an incorrect answer, To this end, the correct answer latch circuit 124 has outputs connected to respective ones of the answer inputs of answer key latch circuits 122. By way of this connection a binary 1 (001) is entered into answer key latch circuits 122 by correct answer latch circuit 124 for a correct answer, and a binary 2 (010) for all other incorrect answers. An appropriately timed reset pulse is also applied to latch circuits 122 by correct answer latch circuit 124 to erase the information previously entered by translation circuits 121, leaving only the information entered by correct answer latch circuit 124 to direct the film transport to the next frame to be viewed. Thus, regardless of the particular answer keys actuated, a new entry, depending only on whether the depressed answer key represents the correct answer, will be entered.

The performance memory 125 allows the programmer to branch his presentation after a predetermined number of selected answers, normally correct answers as designated by the programmer, have been made. This branch is accomplished by simply resetting answer key latch circuits 122 to 0 (000) upon completion of the required number of correct answers, which results in the transport providing an excursion of X frames. The operation of the correct answer latch 124 and performance memory 125 is controlled by dynamically read encodements on the film strip in a manner which will be covered presently.

When an enabled wrong answer key is depressed, correct answer discrimination circuits 123 produce an output which resets performance memory 125 and actuates error counter 78. As previously mentioned, this counter maintains a cumulative total of wrong answers for use by an instructor in monitoring a student-operator's progress, can consist of either an electromechanical-type counter like that shown, or an equivalent electronic-type counter.

It will be recalled that the R answer key results in an X excursion, either forward or backward, depending on the static reading obtained by photodetectors 74 and 75. As seen in FIG. 12, an R answer results in film movement in a reverse direction when a binary 1 (01) is read by these detectors, and in a forward direction when a binary 2 (10) is read. The determination between forward and reverse movement is made by forward/reverse control circuit 127, which includes appropriate logic circuitry for decoding the static reading of detectors 74 and 75. The direction-indicative output of this circuit is applied to motor control circuits 128, which control the operation of the film transport drive motor 79. Of course, the R answer key will not be operative at all unless an appropriate static reading is received from photodetectors 74-77 by gating circuitry 120. Specifically, three static code combinations, (1000), (0111) and (0100), enable the R answer key. The first of these codes enables all five answer keys with R moving the film strip forward, and the second and third codes enable only the R answer key with the film strip moving in reverse. The second and third codes differ in that the second code provides for an error count on counter 78 upon actuation of the R answer key, whereas the third code does not. The determination of whether to register an error is made by appropriate logic circuitry within correct answer discrimination circuits 123, which analyzes the static reading of photodetectors 76 and 77 in making its determination.

After the static encodements have been read and one of the enabled answer keys has been depressed, the film transport moves the film strip to position the next frame for viewing. It will be recalled that as the film strip starts to move, other encodements on the displayed frame are dynamically read to determine the operating mode of the machine, the use of the performance memory, and the excursion of X number. This dynamic reading is accomplished by utilizing one of the four photodetectors, in this case photodetector 77, as a strobe pulse generator to assure that the other readings will be taken when the twelve code bits remaining to be read are correctly positioned with respect to the other three photodetectors 74, 75, and 76. To this end photodetector 77 is positioned slightly behind (relative to forward motion) the other photodetectors so that it will produce an output only after the other encodements are centered in their respective reading zones. This is seen in FIG. 13, wherein the position of photodetector 77, as depicted by the broken line in the static code bit area, is staggered by approximately one-half the width of a code bit from the other photodetectors. Since the strobe pulse generation necessarily relies on a transition from opaque to transparent, or vice versa, the dynamically read code bits assigned to strobe pulse generation, identified as $e_1$–$e_4$, are made alternately opaque and transparent.

Photodetectors 74–76 read the twelve remaining code bits, three at a time, at four stations, or positions, of the moving film strip. To this end the four photodetectors 74–77 are connected to translating means in the form of dynamic reading circuits 129 which utilize the strobe pulses generated by photodetector 77 to convert the outputs of photodetectors 74–76 to useful signals.

Referring to the dynamic code chart of FIG. 14, which is given by way of example as a possible code arrangement for the present teaching machine, the fourth photodetector 77 is seen to generate four strobe pulses $e_1$–$e_4$ as the film passes through reading stations 1–4; respectively. Photodetector 74, at station 1, reads an encodement which determines whether the machine will operate in mode 1 or in mode 2 during the then occurring excursion. This is accomplished by apply the corresponding output of dynamic reading logic circuits 129 to a mode control circuit 130 which includes appropriate output circuitry for controlling the operation of correct answer latch circuits 124 as it effects the entry of new information into answer key latch circuits 122.

Photodetectors 75 and 76, when the film strip is at the first dynamic reading station, provide an output for controlling performance memory 125. In the presence of an output signal from either detector, the performance memory is enabled and will provide an output after a predetermined number of correct answers, as determined by the reading of the photodetectors. Specifically, a binary 0 (00) output from the two detectors, where detector 76 provides the least significant digit, directs a no use and reset of the counter. A binary 1 (01) directs a branch on the fourth consecutive correct answer, a binary 2 (10) directs a branch on the second consecutive correct answer, and a binary 3 (11) directs a branch on the seventh consecutive correct answer. Appropriate decoding and counting circuitry is contained within performance memory 125 to perform the logic and generate the control commands required for these operations.

The remaining dynamically-read encodements, i.e. those read by photodetectors 74–76 at stations 1-4, are utilized to set the X excursion number into an excursion counter 131. As seen in FIG. 14, these encodements are weighted to form a nine digit binary number ranging from 0 to 512 in decimal form. This number is transferred into excursion counter 131 as it is read, thereby establishing an initial counting state in the counter as the film strip begins its excursion to the next frame to be presented. The strobe pulses generated by photodetector 77 are utilized by logic circuits 129 to direct the outputs of photodetectors 74–76 to inputs of proper significance in excursion counter 131.

It will be recalled that a pulse is generated for each frame passing the projection gate by an optical commutator comprising photodetector 107 and lamp 106, which coact with apertures 105 in the strobe disc 104 carried on the sprocket film drive shaft 83. These pulses are amplified in a suitable pulse amplifier 132, which may comprise part of a unitary photodetector-amplifier assembly. The amplified pulses are applied to an excursion counter 131, wherein they count the counter down, one count for each frame passing the projection gate.

Once set in motion, film strip 36 continues to move until excursion counter 131 reaches a predetermined minimum counting state, as determined by the particular answer key depressed by the student-operator, and whether correct answer latch circuit 124 or performance memory 125 have been active. To this end a binary code comparator 133 is provided for comparing the state of answer key latches 122, which represent in binary form the desired minimum counting state, with the counting state of excursion counter 131. When the two inputs to code comparator 133 agree, a "ready to stop" output signal is generated by comparator 133 and applied to motor control circuits 128 to initiate a stop sequence. At this point the motor switches from run to slow speed, and continues to run until the next frame counting pulse is received by motor control ciruits 128 from photodetector 107, at which time current to motor 79 is interrupted and solenoid 102 is released. The film continues to coast for a short interval of approximately one-sixth of a frame until one of the four faces of centering cam 85 squares with centering bar 97, at which time the film strip stops with the next frame to be viewed accurately positioned in projection gate 42. Thus, the excursion is accomplished in a smooth controlled manner, the film being progressively slowed as it reaches the desired viewing frame and finally brought to a complete stop perfectly centered in the projection gate. It will be appreciated that the excursion to the next viewing frame can occur in either a forward or a reverse direction when the R answer key is depressed, depending on the state of forward/reverse control circuit 127, which in turn depends on the static code detected by photodetectors 74 and 75 prior to tape motion.

Should an inoperative answer key, e.g. one not representing a valid response to the question presented, be depressed, answer key gating circuits 120 provide an output signal which is applied to a no-go circuit 134. This circuit immediately functions to simultaneously light error lamp 34 on the front panel, to disable all answer keys, and to record an error on error counter 78. To these ends one output from no-go circuit 134 is coupled to gating circuits 120 wherein it disables all answer keys, and another output is coupled to error counter 78 wherein it registers as an error. The lamp stays lit and the disable condition exists for a short period of time, typically approximately one and one-half seconds, to discourage indiscriminate operation of answer keys by the student.

Figure 11:
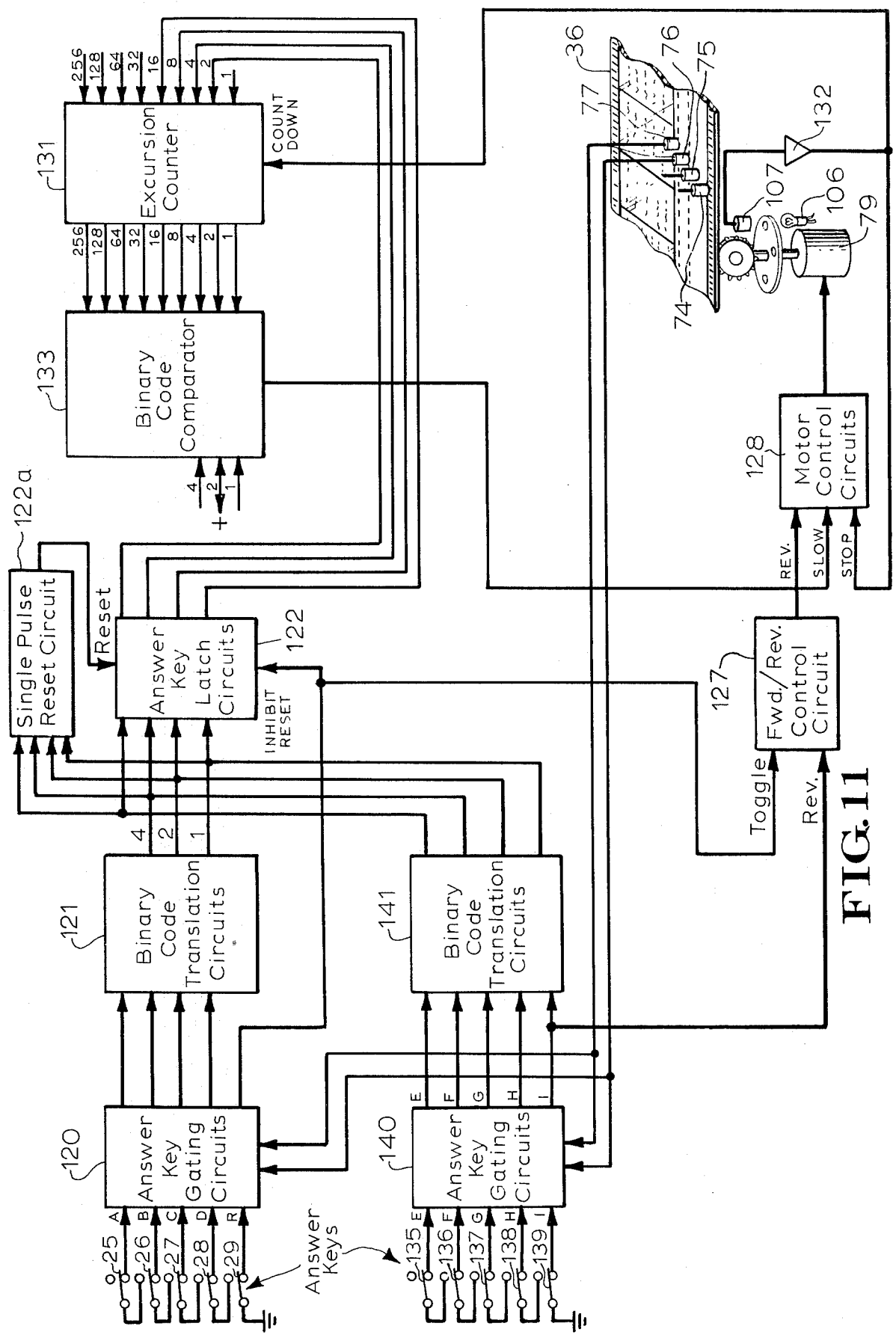
FIG. 11 is a functional block diagram of the teaching machine of the FIG. 1 in its alternate mode of operation.

The teaching machine of the present invention provides an alternate fixed-excursion mode 3 operation wherein predetermined fixed excursions are provided for each answer key. In accordance with one aspect of the invention, this is accomplished using substantially the same circuitry as used in the previously described variable-excursion mode 1 and mode 2 operation, thereby avoiding additional complication and cost in the teaching machine. Referring to FIG. 11, five additional answer keys 135-139, corresponding to answer selections E-I, are provided to accomodate the additional answers possible in fixed-excursion operation. Additional answer key gating circuits 140 and binary code translation circuits 141 are also provided to gate the added answer keys and to convert the outputs of the additional keys to a four digit binary code, corresponding to numerical values of 5, 6, 7, 8 and 10 for keys E-I, respectively. Like gating circuits 120 and translation circuits 121, this circuitry may be conventional in design and constuction, providing the desired high and low output levels indicative of binary 1 and 0 states, respectively. The four ouputs from translation circuits 141 are applied, together with the three outputs from translation circuits 121, to answer key latch circuits 122. There, as during the previously described variable-excursion operation, individual memory circuits or flip-flops are set in accordance with the binary state of each input. The states are retained in latch circuits 122, forming in effect a memory for the answer key selection last made by the operator-student.

As during variable-excursion mode 1 and mode 2 operation, a determination is made by a static reading of film strip 36 as to which of the possible answer keys are to be operative. In this case the outputs of photodetectors 76 and 77 are simultaneously applied to gating circuits 120 and 140 wherein appropriate logic circuitry is contained for enabling selected groups of answer keys. Specifically, for a binary 0 reading (00), wherein detector 75 provides the least significant digit, all answer keys are operative. When a binary 2 (10) is read, only the R answer key is operative. When a binary 1 (01) is read, answer keys A-H are operative. When a binary 3 (11) is read, only the I answer key is operative.

During the fixed-excursion operation, the A, B, C, D, E, F, G, H and I answer keys of the teaching machine require excursions of 1, 3, 5, 7, 9, 11, 13, 15 and 19 frames, respectively. In obtaining these excursions, the binary codes provided by answer keys A, B, C and D remain the same as during the previously described variable-excursion mode 1 and mode 2 operation, namely binary 1 (0001), 2 (0010), 3 (0011) and 4 (0100), respectively. The binary codes provided by answer keys E, F, G, H and I are selected to be 5 (0101), 6 (0110), 7 (0111), 8 (1000) and 10 (1010), respectively. These binary codes are entered into answer key latch circuits 122 as before. However, the output of this latch circuits is now applied with a one digit upward shift to excursion counter 131 wherein it establishes an initial counting state, the least significant digit in latch circuits 122 corresponding to the second to the least significant digit in the counter. This results in answer keys A, B, C, D, E, F, G, H, and I generating initial counting states of 2, 4, 6, 8, 10, 12, 14, 16, and 20, respectively. Since these counting states are greater than those required for these answer keys in fixed excursion operation, one counting state is effectively subtracted by establishing the other comparison input of binary code comparator 133 at a fixed binary 2 state (010). Since the film transport requires one frame to stop after comparator 133 recognizes a comparison between its inputs and gives the "ready to stop" signal, and this will now be given with two counts remaining before excursion counter 131 reaches 0, the desired net excursions of 1, 3, 5, 7, 9, 11, 13, 15 and 19 frames are obtained.

Actuation of the R answer key commands the machine to drive the film in the opposite direction of its most recent excursion a distance equal to that excursion. This is accomplished by utilizing the R answer key related output of gating circuits 120 to inhibit the reset of answer key latch circuits 122, thereby causing the previous excursion instruction, still stored in the latch circuits, to be applied to excursion counter 131. At the same time, the R related output is applied to the toggle input of forward-reverse control circuit 125 to cause the transport motor 79 to operate in the opposite direction of its last excursion. Similarly, the I answer key, which is intended to move the film in reverse, is connected to the reverse input of control circuit 127 to cause the drive motor to operate in reverse upon actuation of that key. If no signal is applied to either its toggle or reverse inputs, control circuit 127 will cause the drive motor to operate in a forward direction.

Once the binary code stored in answer key latch circuits 122 has been tranferred to excursion counter 131, the film begins to move and the counter is counted down by pulses generated in the frame-counting photodetector 107. When the counter reaches a counting state of 2 (000000010), binary code comparator 133 senses a comparison and generates an output pulse for application to motor control circuits 128. This pulse immediately switches motor 79 from run to slow speed, thereby initiating a stop cycle. It remains for the next frame counting pulse from photodetector 107 to cause motor control circuits 128 to stop motor 79 and release solenoid 102 so that the film strip can coast into position with the selected frame being positioned in the projection gate.

Thus, fixed excursions result for each of the answer keys, with the exception of the R answer key, which utilizes the previous excursion of the machine, as stored in answer key latch circuits 122, to return the film strip to the previously projected frame. To this end the R answer key, when enabled and actuated, applies a signal to only the reset inhibit control input of latch circuits 122 which causes the excursion instruction therein to remain as in the previous excursion and to be transferred to the input of excursion counter 131. At the same time the R answer key applies a signal to forward-/reverse control circuit 127 to reverse the direction of film motion. The I answer key likewise requires a reversal in film direction, and this is obtained by applying a signal to the reverse input of control circuit 127.

Thus, a teaching machine has been described which provides for random access to any selected frame on an instructional film strip. In normal variable-excursion operation the particular frame displayed by the machine depends on both the student-operator's response to the previous question and the excursion instructions placed on the previous frame by the programmer, making possible branched programming wherein the student is paced to proceed at a rate dependent on his demonstrated progress. Great flexibility is provided to the programmer in that displayed material may appear at locations up to 512 frames distant from the frame being displayed. In its alternate fixed-excursion operating mode, the teaching machine provides for excursions dependent only on the answer key actuated by the student. This mode is particularly useful in connection with previously prepared instructional films wherein the excursions for each answer key are fixed.

The teaching machine of the present invention achieves great versatility with a minimum number of functional stages. Mechanically, it provides a convenient film transport deck which includes a novel automatic film strip threading arrangement. Novel bidirectional hub assemblies are provided for smooth, reliable handling of the instructional film, and the operating mode of the teaching machine is automatically determined upon insertion of a film cassette. Smooth jam-proof operation of the film transport is further assured by a novel two-speed motor drive which provides a controlled multiple-step stop cycle. Simultaneousaudio presentations may be made with the addition of appropriate circuitry.

In its normal operating mode, the teaching machine provides for a combined static and dynamic reading of code indicia on the film strip. This lessens the number of photodetector elements required within the machine, conserves space on the individual frames of the film strip, and provides improved reliability by obviating critical alignment problems. The code indicia carried on the film strip provide for enabling only selected answer keys to preclude improper or frivolous actuation, and provide means for determining the correct answer when this is required. A performance memory also controlled by the code indicia is provided to allow branching after a predetermined number of consecutive correct answers.

While the code indicia on the film strip control many different functions within the teaching machine, it should be noted that only four photodetectors are required. This is made possible by a novel reading method combining static and dynamic techniques, and a novel code reading station assembly wherein the individual photodetectors are restricted to reading well-defined zones on the film strip.

Figure 15:
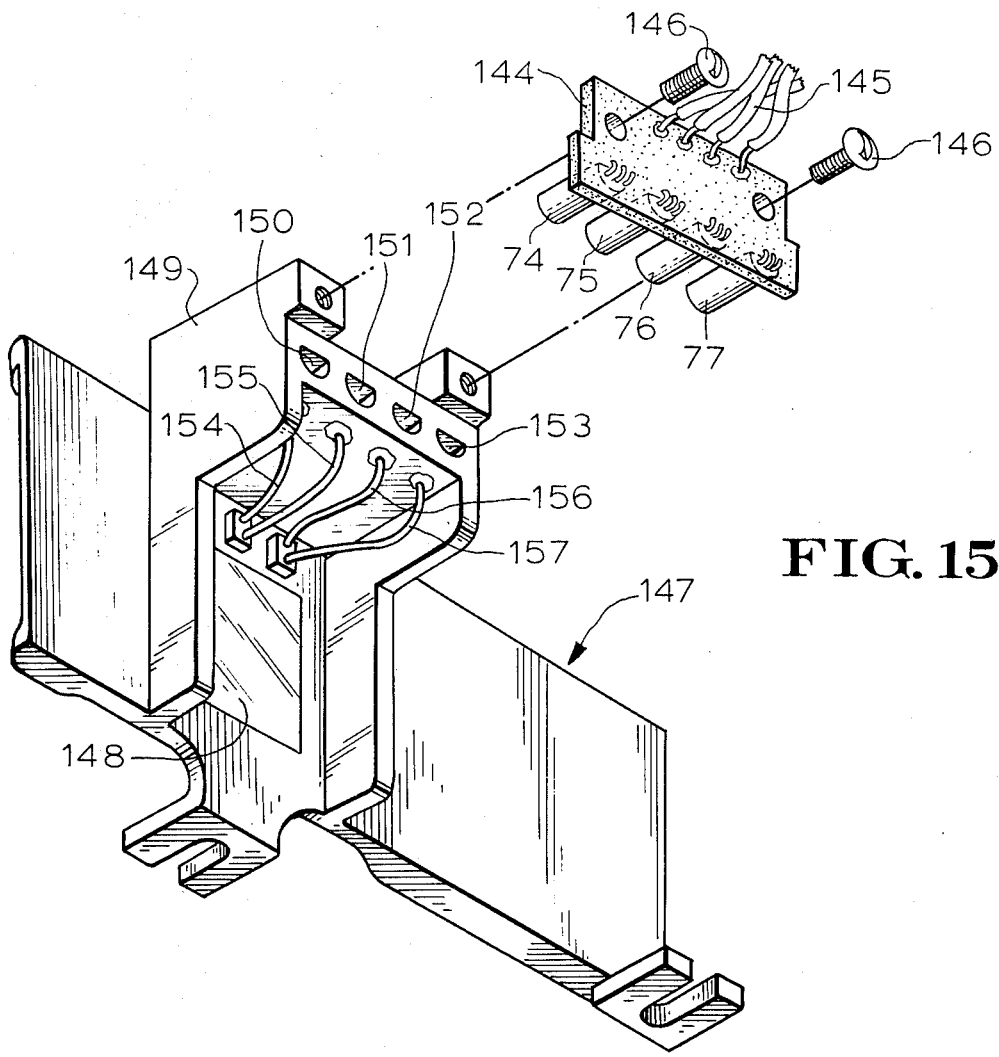
FIG. 15 is an exploded perspective view from the rear of the reading station of the film transport of FIGS. 5 and 6.
Figure 16:
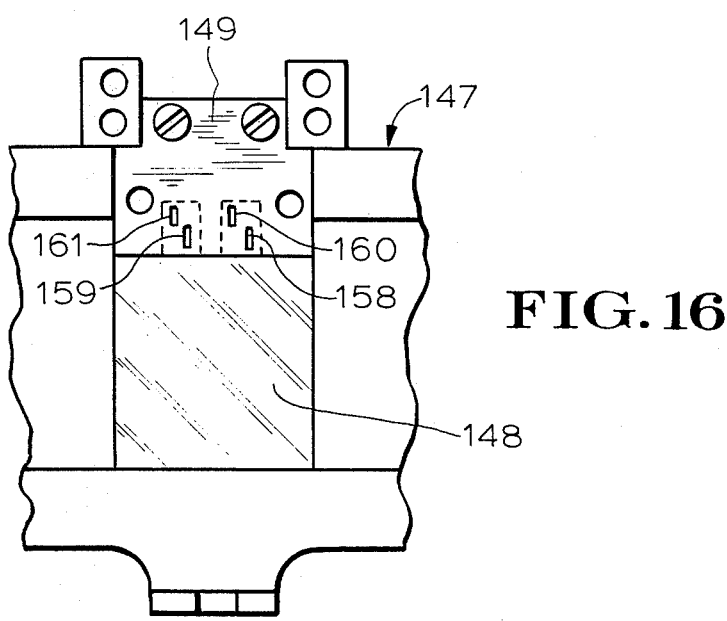
FIG. 16 is a front elevational view of the reading station of FIG. 15.

Referring to FIGS. 15 and 16, the four photodetectors 74–77 are seen to be mounted by conventional methods to a printed wiring board 144, from which a plurality of conductors 145 are attached to carry signals into the machine. The printed wiring board mounts by means of a pair of machine screws or equivalent fasteners 146 to the rear face of a molded housing 147 which includes an extended flat portion rounded at either end for contacting the film strip and a transparent window 148 through which selected frames are projected. The housing includes a block portion 149 adjacent window 148 which has four generally cylindrical recesses 150–153 for receiving the four photodetectors. These recesses may be D-shaped to compliment the similarly shaped bodies of certain types of photodetectors and thereby provide more accurate alignment of the detectors.

Four light pipes 154–157, which may be constructed of conventional fiber-optic material, extend through the wall of cylindrical recesses 150–153, respectively, approximately one-third of the way down and are separately routed to accurately defined reading zones 158–161 above the projection windows. These locations correspond respectively to the locations of the four photodetectors 74–77 indicated as broken lines in the static reading zones of FIG. 13. The light pipes enable the photodetectors to be located at a remote location, in this case on block portion 149. This is an important advantage in a teaching machine system since multiple code indicia must be closely spaced within a relatively small area on each film frame, and the size of available photodetectors makes achieving the close spacing required to accurately read the indicia exceedingly difficult. With remotely located photodetectors it is possible to merely vary the diameter of the light pipes to achieve close spacing.

No attempt has been made herein to describe the circuitry of the individual functional stages in detail since the circuitry is conventional and well known to the art. Furthermore, while specific code and film formats have been given, it will be appreciated that other code and film formats are possible, and that a greater or a smaller number of photodetectors and encodements may be used in the teaching machine system of the invention. Moreover, while a specific construction of film transport has been shown and described which has numerous novel and useful features, it will be appreciated that other types of transports, including sprocket-less drives with other types of centering methods, could be utilized with the system of the invention.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a teaching machine of the type which displays selected frames from a multiple frame film strip wherein instructional material is contained on first portions of said frames and code indicia, including an excursion instruction for proceeding to a subsequent frame to be displayed, is contained on second portions of said frames, a film transport comprising:
   means including a projection gate for displaying the first portion of individual ones of said frames when aligned in said projection gate;
   a supply reel for storing said film strip in a rewound position;
   a take-up reel for receiving said film strip;
   film drive means for advancing said film strip from said supply reel, through said projection gate, and onto said take-up reel;
   a permanent leader comrpising in length a plurality of frames and extending in a home position from a point of engagement with said film strip through said projection gate to said take-up reel, the frame of said leader then in said projection gate being a predetermined number of frames from the first viewing frame of said film strip and having a related initial excursion instruction on said leader; and
   automatic loading means responsive to said initial excursion instruction for causing said film drive means to advance said leader said predetermined number of frames from said home position to position said first viewing frame of said film strip in said projection gate.

2. A film transport as defined in claim 1 wherein said teaching machine further includes a counter responsive to applied pulses for counting down from an initial counting state, means for generating pulses to count said counter down from said initial counting state as said frames of said permanent leader and said instructional film strip pass said projection gate, and means for stopping the motion of said film strip when said counter reaches a predetermined minimum counting state, and wherein said automatic loading means include means for entering said initial excursion instruction from said leader into said counter.

3. A film transport as defined in claim 1 which further includes position sensing means for automatically stopping said leader in said home position after said film strip has been rewound onto said supply reel.

* * * * *

UNITED STATES PATENT AND TRADEMARK OFFICE
CERTIFICATE OF CORRECTION

PATENT NO. : 4,043,054
DATED : August 23, 1977
INVENTOR(S) : Norman A. Crowder

It is certified that error appears in the above-identified patent and that said Letters Patent are hereby corrected as shown below:

```
Column 7, line 20, "a" should read --an--
Column 7, line 48, "a" should read --an--
Column 8, line 50, after "machine of" delete --the--
Column 12, line 17, "swith" should read --switch--
Column 13, line 19, "rewind-stop stop" should read
 --rewind-stop--
Column 13, line 30, after "film" (second occurrence)
 insert --handling--
Column 14, line 33, "linear" should read --liner--
Column 14, line 51, "fractional" should read --frictional--
Column 14, line 65, "nmembers" should read --members--
Column 16, line 9, "lower" should read --lever--
Column 17, line 47, "operation" should read --operating--
```

Signed and Sealed this

Thirteenth Day of June 1978

[SEAL]

Attest:

RUTH C. MASON
*Attesting Officer*

DONALD W. BANNER
*Commissioner of Patents and Trademarks*